(12) United States Patent
Khera et al.

(10) Patent No.: US 7,185,415 B2
(45) Date of Patent: Mar. 6, 2007

(54) METHOD FOR FORMING A MAGNETIC HEAD HAVING A FLUX SHAPING LAYER

(75) Inventors: Gautam Khera, Morgan Hill, CA (US); Sanford J. Lewis, Palo Alto, CA (US); Galina Moutchaidze, San Jose, CA (US); Aron Pentek, San Jose, CA (US); Hugo Alberto Emilio Santini, San Jose, CA (US); Mason Lamar Williams, III, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 539 days.

(21) Appl. No.: 10/653,046

(22) Filed: Aug. 29, 2003

(65) Prior Publication Data

US 2005/0044699 A1   Mar. 3, 2005

(51) Int. Cl.
*H04R 31/00* (2006.01)
*G11B 5/147* (2006.01)

(52) U.S. Cl. .............. 29/603.12; 29/603.13; 29/603.14; 29/603.15; 29/603.18; 360/126

(58) Field of Classification Search ........... 29/603.12, 29/603.13, 603.14, 603.15, 603.18; 205/118, 205/119, 122, 222; 427/127; 216/66; 360/126, 360/317, 319, 325, 122, 129
See application file for complete search history.

(56) References Cited

U.S. PATENT DOCUMENTS

| | | | |
|---|---|---|---|
| 4,710,838 A | 12/1987 | Jahnke | 360/125 |
| 5,408,373 A | 4/1995 | Bajorek et al. | 360/104 |
| 5,479,310 A | 12/1995 | Atsushi et al. | 360/126 |
| 5,560,097 A | 10/1996 | Bajhorek et al. | 29/603.12 |
| 5,600,519 A | 2/1997 | Heim et al. | 360/126 |
| 5,710,510 A * | 1/1998 | Seagle et al. | 324/210 |
| 5,843,521 A | 12/1998 | Ju et al. | 427/129 |
| 5,874,010 A | 2/1999 | Tao et al. | 216/22 |
| 6,043,960 A | 3/2000 | Chang et al. | 360/126 |
| 6,130,809 A | 10/2000 | Santini | 360/317 |
| 6,158,107 A | 12/2000 | Chang et al. | 29/603.14 |
| 6,172,848 B1 | 1/2001 | Santini | 360/126 |
| 6,266,868 B1 * | 7/2001 | Sasaki | 29/603.1 |
| 6,278,591 B1 | 8/2001 | Chang et al. | 360/317 |
| 6,282,056 B1 | 8/2001 | Feng et al. | 360/126 |
| 6,282,776 B1 | 9/2001 | Otsuka et al. | 29/603.14 |

(Continued)

FOREIGN PATENT DOCUMENTS

EP    0616316    9/1998

(Continued)

*Primary Examiner*—A. Dexter Tugbang
*Assistant Examiner*—Tai Van Nguyen
(74) *Attorney, Agent, or Firm*—Zilka-Kotab, PC

(57) ABSTRACT

A method for fabricating a magnetic head includes forming a first pole and a flux shaping layer in spaced relation to the first pole. A nonmagnetic layer is formed adjacent the flux shaping layer and positioned on an air bearing surface (ABS) side of the flux shaping layer. A tapered recess is created in the nonmagnetic layer, the taper of the recess increasing (i.e., becoming deeper) towards the flux forming layer. The recess is filled with a magnetic material. A probe layer is formed such that it is in electrical communication with the magnetic material filling the recess.

19 Claims, 13 Drawing Sheets

U.S. PATENT DOCUMENTS

| | | | |
|---|---|---|---|
| 6,339,523 B1 | 1/2002 | Santini et al. | 360/317 |
| 6,385,008 B1 | 5/2002 | Santini et al. | 360/126 |
| 6,388,845 B1 * | 5/2002 | Sasaki | 360/317 |
| 6,396,670 B1 * | 5/2002 | Murdock | 360/319 |
| 2001/0012541 A1 | 8/2001 | Sasaki et al. | 427/130 |
| 2001/0013505 A1 | 8/2001 | Sasaki | 216/74 |
| 2001/0050830 A1 | 12/2001 | Otsuka et al. | 360/125 |
| 2002/0018317 A1 | 2/2002 | Sato et al. | 360/126 |
| 2002/0024777 A1 | 2/2002 | Funayama et al. | 360/318.1 |
| 2002/0034043 A1 | 3/2002 | Okada et al. | 360/125 |

FOREIGN PATENT DOCUMENTS

| | | |
|---|---|---|
| EP | 0822540 | 4/2000 |
| JP | 62132209 | 6/1987 |
| JP | 10320720 A2 | 12/1998 |

* cited by examiner

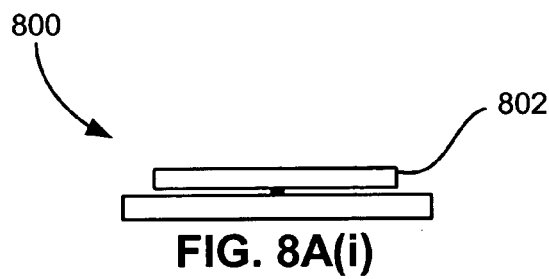
FIG. 8A(i)
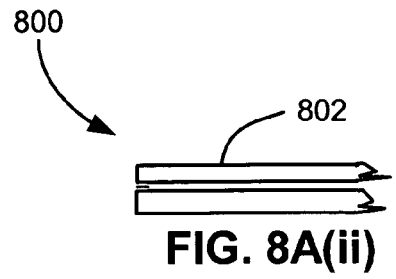
FIG. 8A(ii)
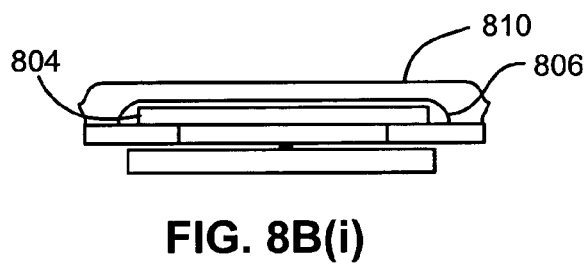
FIG. 8B(i)
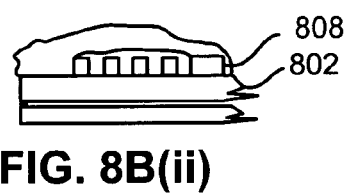
FIG. 8B(ii)
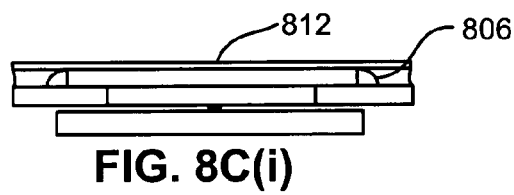
FIG. 8C(i)
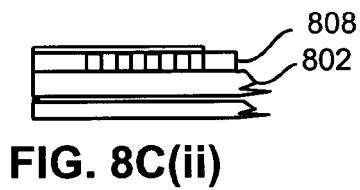
FIG. 8C(ii)
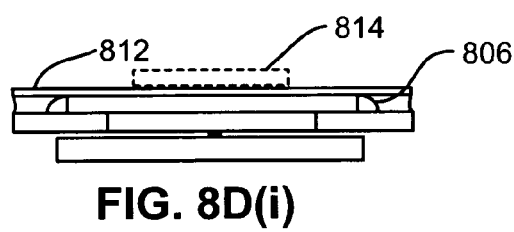
FIG. 8D(i)
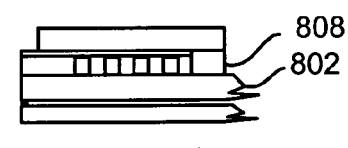
FIG. 8D(ii)
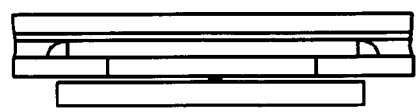
FIG. 8E(i)
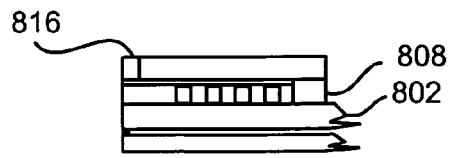
FIG. 8E(ii)
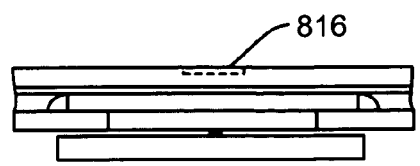
FIG. 8F(i)
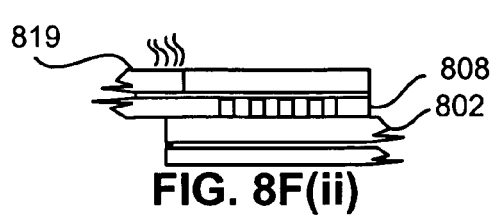
FIG. 8F(ii)

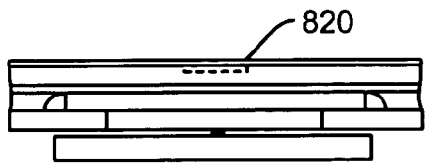
FIG. 8G(i)
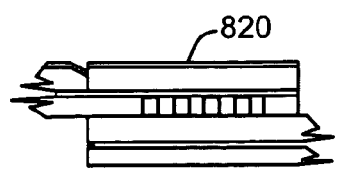
FIG. 8G(ii)
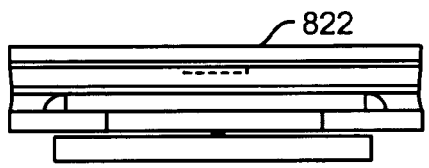
FIG. 8H(i)
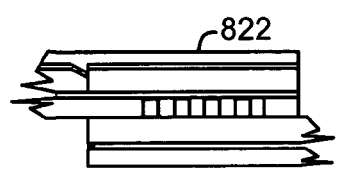
FIG. 8H(ii)
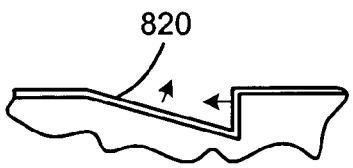
FIG. 8H(iii)
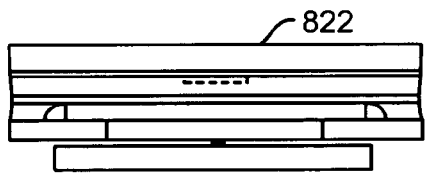
FIG. 8I(i)
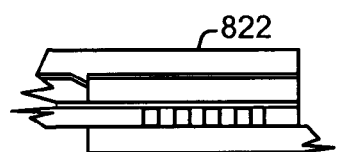
FIG. 8I(ii)
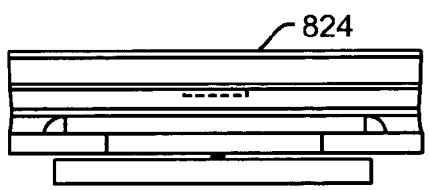
FIG. 8J(i)
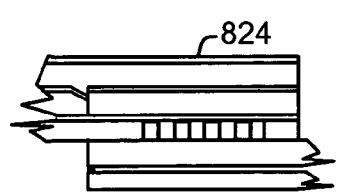
FIG. 8J(ii)
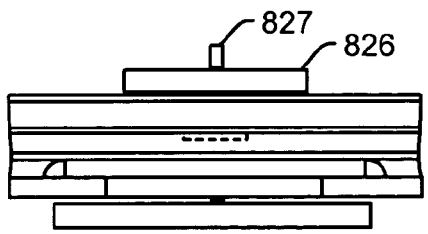
FIG. 8K(i)
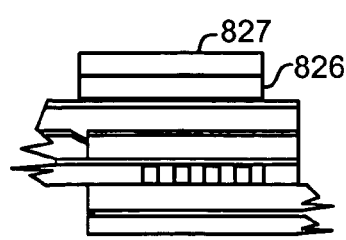
FIG. 8K(ii)

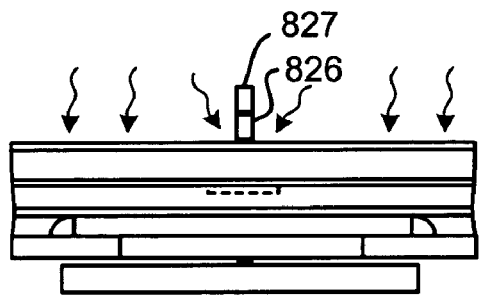
FIG. 8L(i)
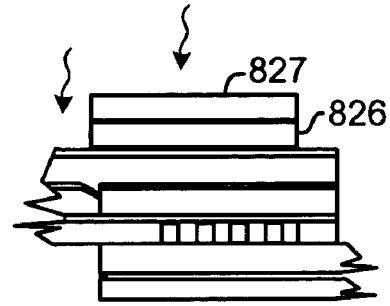
FIG. 8L(ii)
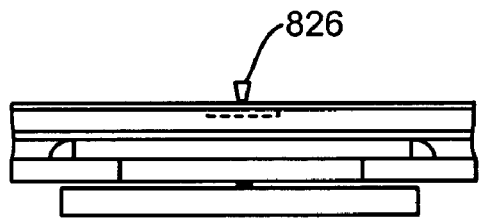
FIG. 8M(i)
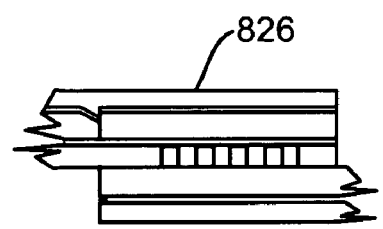
FIG. 8M(ii)
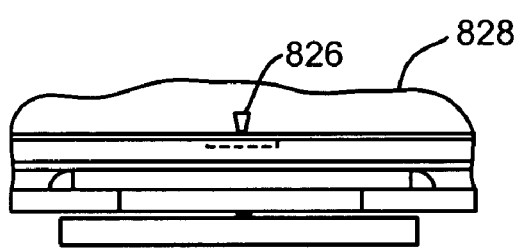
FIG. 8N(i)
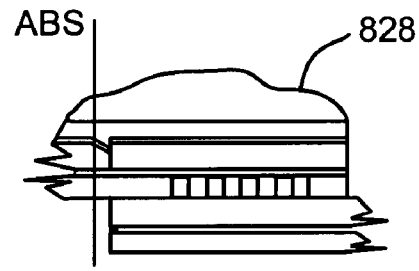
FIG. 8N(ii)

METHOD FOR FORMING A MAGNETIC HEAD HAVING A FLUX SHAPING LAYER

FIELD OF THE INVENTION

The present invention relates to magnetic heads, and more particularly, this invention relates to a probe pole having a flux shaping layer, and processes for forming the same.

BACKGROUND OF THE INVENTION

In a magnetic disk storage apparatus, data on the recording media is read and written by a magnetic head. In order to increase the recording capacity per unit area of the magnetic disk, it is necessary to increase the area recording density. However, the area recording density of existing in-plane recording systems can not be increased as the length of bits to be recorded is decreased because of thermal fluctuation in the magnetization of the media.

A perpendicular recording system which records magnetization signals in a direction perpendicular to a medium is adapted to address this problem. In the perpendicular recording system, a magnetoresistive head ("MR head") or a giant magnetoresistive head ("GMR head") with a larger read output than non-perpendicular systems can be used for reading. However, a single pole head must to be used for the writing head in these systems. With perpendicular recording, it may be necessary to improve the track density and the linear recording density in order to improve the recording density. To improve the track density, the track width of the magnetic head is decreased and formed with higher accuracy.

In a perpendicular recording system, the shape of the main pole of the single pole type recording head has a significant effect on the magnetization pattern of the media. Specifically, the shape of the upper end face of the main pole, which is the end face of the main pole on the side opposite to the MR head (on the trailing side), greatly affects the shape of the magnetization pattern of the media. For example, JP-10-320720/1998 discloses the structure of a single pole type head having a main pole of a trapezoidal shape flattened at the upper end face and wider on the side of the MR head.

However, in the description in JP-10-320720/1998, a description is made of side recording tracks defined by the slope on both sides of the trapezoidal shape. These side recording tracks reduce cross talk with adjacent recording tracks, however, they hinder the improvement of the track density which therefore hinders improvements in the area recording density. In such a magnetic disk storage apparatus, a skew angle is formed when the magnetic head scans from the inner circumference to the outer circumference of a disk, in which the pole shape and associated magnetic fields erase signals on adjacent tracks. JP-10-320720/1998 has no specific descriptions about the pole forming method.

By using a polishing method, the upper surface of the main pole (second pole) can be flattened. However, when a polishing method such as chemical mechanical polishing (CMP) is used, it is difficult to control the layer thickness which hinders the accuracy of the layer thickness. The thickness may vary by as much as about ±0.5 μm. This inaccuracy scatters the layer thickness of the main pole, thereby causing scattering in the intensity of the magnetic field from the main pole.

FIGS. 1A–1B show a prior art design of a perpendicular head 100. The performance of this design depends on the flux carrying capacity of the probe layer 102 as well as the shaping layer 104 placed underneath. The saturation point for the probe layer is located just after the end of the shaping layer. This saturation of the probe reduces the head's efficiency and the amount of flux that can be delivered to the disk. This reduced flux demands lower coercivity media thus reducing the latency of the recording operation.

FIG. 2 illustrates a prior art single layer coil head 200 where the end of the shaping layer 202 (zero throat height (ZTH)) is placed behind the ABS plane 204. This distance is controlled by two limits. One is the close-to-the-ABS limit where the shaping layer will start writing on the disk. The other limit is the too-far-from-the-ABS limit where the probe flux is very limited by saturation and overwrite problems occur.

Thus, it is desirable for a pole write head to be so designed that the flux density at the pole tip is close to the saturation flux density of the magnetic material used for the pole so that the largest possible write field may be obtained, permitting the use of high coercive field media with well known advantages in terms of thermal stability and recording resolution. When a pole head of constant cross-section is in position over a recording medium with a magnetically soft underlayer, the flux density increases with distance from the pole tip because fringing flux between the sides of the pole and the underlayer adds to the flux which comes through the air-bearing surface end of the pole. It is well known that the flux density can be decreased by increasing the cross-section of the pole with distance from the air-bearing surface. For example, in U.S. Pat. No. 4,710,838, A. Jahnke describes a "widening leg part", and in U.S. Pat. No. 5,600,519, D. Heim and M. Williams describe how designing the cross-section area proportional to the flux density that would obtain in a constant cross-section pole can be used to extend the length of the saturating region. In U.S. Pat. No. 5,479,310, Atsushi, et al, describe a longitudinal recording head with a deliberate reduced cross section to limit saturation at the pole tips.

The manufacturing process for thin film recording heads includes a step in which individual or rows of heads are lapped to provide the correct stripe height on the sensor element which is used to read data from the disk. Because of various manufacturing tolerances, this results in some variation in the location of the air-bearing surface along the pole in the direction normal to that final air-bearing surface. As a consequence, any increase in cross-section of the pole accompanied by a variation in width at the trailing edge of the pole would result in an undesirable variation in written track-width. It is also understood that in many applications, a pole head should be capable of operating at several degrees of skew as determined by the rotary head positioning actuator design without writing on adjacent tracks, so a trapezoidal cross section of the pole is desired when viewed from the air-bearing surface.

The combined effect of this desirable trapezoidal cross section and the uncertainty of the air bearing location would again result in an uncertain written track-width if the trailing surface of the pole does not lie in a plane perpendicular to the air-bearing surface. The remaining surface which may be slanted is the leading edge of the pole. Tapering the thickness of the pole by sloping the leading edge from the air-bearing surface back to a distance such that the cross-section may be increased without danger of excessive side-writing has been shown to improve writability. In these experiments, a focused ion-beam (FIB) system was used to mill a taper from the air-bearing surface after lapping was completed. Such modified heads could write 12 KOe media, where only about 9 KOe media could be written with constant cross section poles. Similar results were reported by Y. Kawato, et al, of Hitachi, in "Single-pole type GMR heads for perpendicular recording at ultrahigh areal densities", presented as paper CA-02 at the 8th joint MMM-Intermag conference in 2001. These experiments involving FIB milling at the air-bearing surface, however, are not regarded as economically feasible for the manufacturing production of large numbers of recording heads.

SUMMARY OF THE INVENTION

The present invention overcomes the drawbacks and limitations described above by providing a magnetic head with a probe pole having a tapered portion and method for forming the same.

A method for fabricating a magnetic write head includes forming a first pole, coils, and a flux shaping layer in spaced relation to the first pole. A nonmagnetic layer is formed adjacent the flux shaping layer and positioned on an air bearing surface (ABS) side of the flux shaping layer. A tapered recess is created in the nonmagnetic layer, the taper of the recess increasing (i.e., becoming deeper) towards the flux forming layer. The recess is filled with a magnetic material. A probe layer is formed such that it is in electrical communication with the magnetic material filling the recess.

According to one embodiment, the recess is formed by focused ion beam processing. Preferably, the focused ion beam is angled towards the ABS side of nonmagnetic layer at an acute angle with respect to a plane of the surface of the nonmagnetic layer being processed by the focused ion beam. As one option, a power of the focused ion beam increases as the focused ion beam travels towards the flux shaping layer and/or decreases as the focused ion beam travels away from the flux shaping layer. The probe layer can be subsequently reduced by chemical mechanical polishing to reduce a thickness thereof to a desired thickness. Preferably, an angle of the taper of the taper recess is between about 10 and 75 degrees, more preferably between about 20 and 45 degrees, with respect to an imaginary plane extending through the nonmagnetic layer and the flux shaping layer.

According to another embodiment, the recess is formed by chemical mechanical polishing. Preferably, the step of forming the nonmagnetic layer adjacent the flux shaping layer includes forming the nonmagnetic layer under processing conditions which provide predictable properties of the nonmagnetic layer near an edge of the nonmagnetic layer positioned towards the flux shaping layer. As an option, the steps of forming the nonmagnetic layer and chemical mechanical polishing can be repeated at least one additional time for forming the tapered recess. Preferably, an angle of the taper of the taper recess is between about 10 and 75 degrees, more preferably between about 20 and 45 degrees, with respect to an imaginary plane extending through the nonmagnetic layer and the flux shaping layer.

In a further embodiment, the recess is formed by nano-indentation using a nano-indentation device. As an option, a tip of the device engaging the nonmagnetic layer can be positioned within an acute arc extending towards an ABS end of the nonmagnetic layer and a perpendicular line extending outwardly from an imaginary plane extending through the nonmagnetic layer and the flux shaping layer.

In yet another embodiment, the recess is formed by nano-scratching using a nano-scratch device. Preferably, a tip of the device engaging the nonmagnetic layer is positioned within an acute arc extending towards an ABS end of the nonmagnetic layer and a perpendicular line extending outwardly from an imaginary plane extending through the nonmagnetic layer and the flux shaping layer.

Depending on manufacturing preferences, the recess can be filled and the probe layer formed during the same processing step or during separate processing steps.

Additional processing steps may include processing the fist pole, coils, nonmagnetic layer, and probe for forming an ABS.

A method for fabricating a magnetic head according to yet another embodiment includes forming a first pole, forming a flux shaping layer in spaced relation to the first pole, and forming a nonmagnetic layer above the flux shaping layer. A layer of resist is added such that it partially covers the nonmagnetic layer and is positioned towards an ABS side of the nonmagnetic layer. The nonmagnetic layer is milled for removing a portion of the nonmagnetic layer thereby forming a tapered end of the nonmagnetic layer and a void. The resist creates a shadow effect for the milling. The tapered end of the nonmagnetic layer is positioned opposite the ABS side of the nonmagnetic layer. The tapered end of the nonmagnetic layer tapers away from the ABS side of the nonmagnetic layer. The resist is removed, and a layer of magnetic material is added to the void formed by the milling.

The milling may be performed at an angle relative to an imaginary plane extending along the nonmagnetic layer. Preferably, the nonmagnetic layer is milled by ion beam milling. The angle of the beam can be pivoted relative to an imaginary plane extending along the nonmagnetic layer. The layer of magnetic material may be of sufficient thickness for forming a probe layer having a tapered portion towards the tapered end of the nonmagnetic layer.

As one option, the resist may be removed prior to adding the layer of magnetic material. As another option, the resist is removed after adding the layer of magnetic material. In the latter case, a second layer of magnetic material of sufficient thickness for forming a probe layer is added. The second layer will have a tapered portion towards the tapered end of the nonmagnetic layer.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIGS. 8A(i)–8N(ii) graphically illustrate a method of fabrication of a perpendicular recording head using focused ion beam processing.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1A:
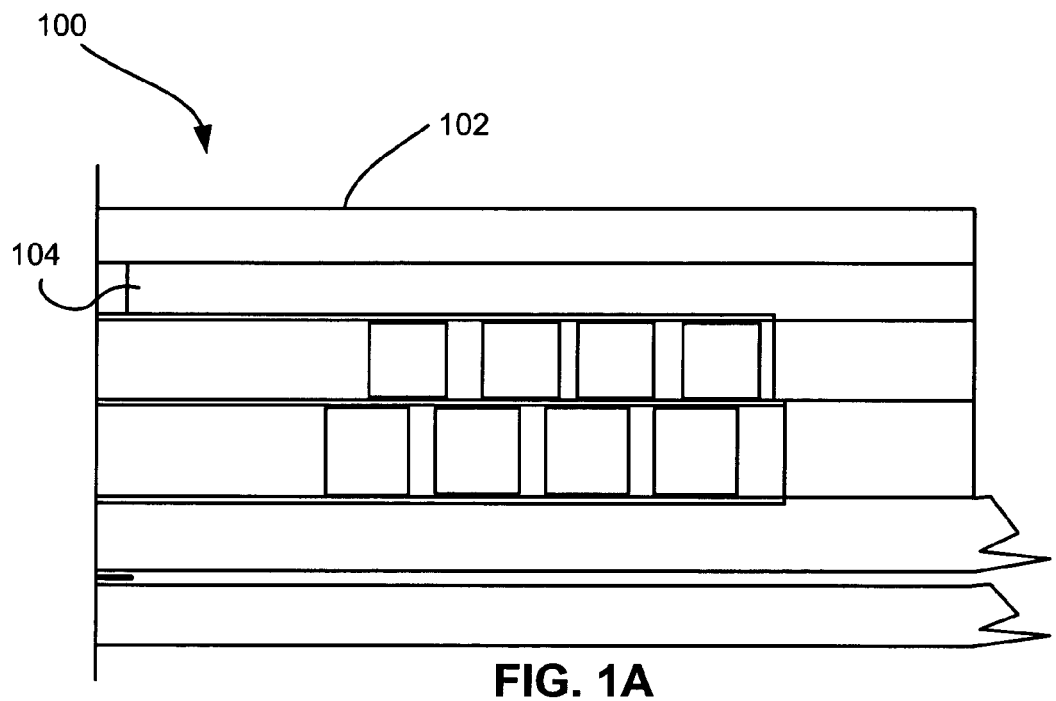
FIGS. 1A–1B are partial cross sectional views of prior art perpendicular heads.
Figure 1B:
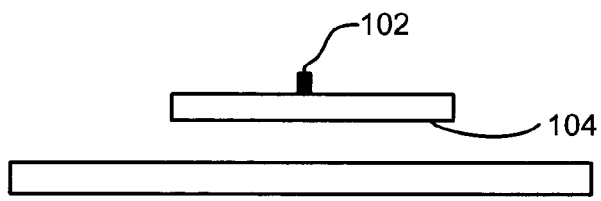
Figure 2:
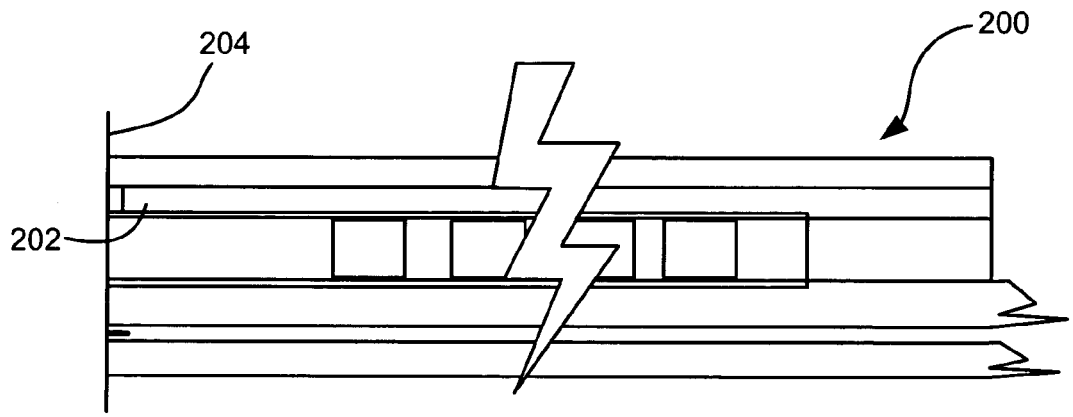
FIG. 2 illustrates a prior art single layer coil head where the end of the shaping layer is placed behind the ABS plane.
Figure 3:
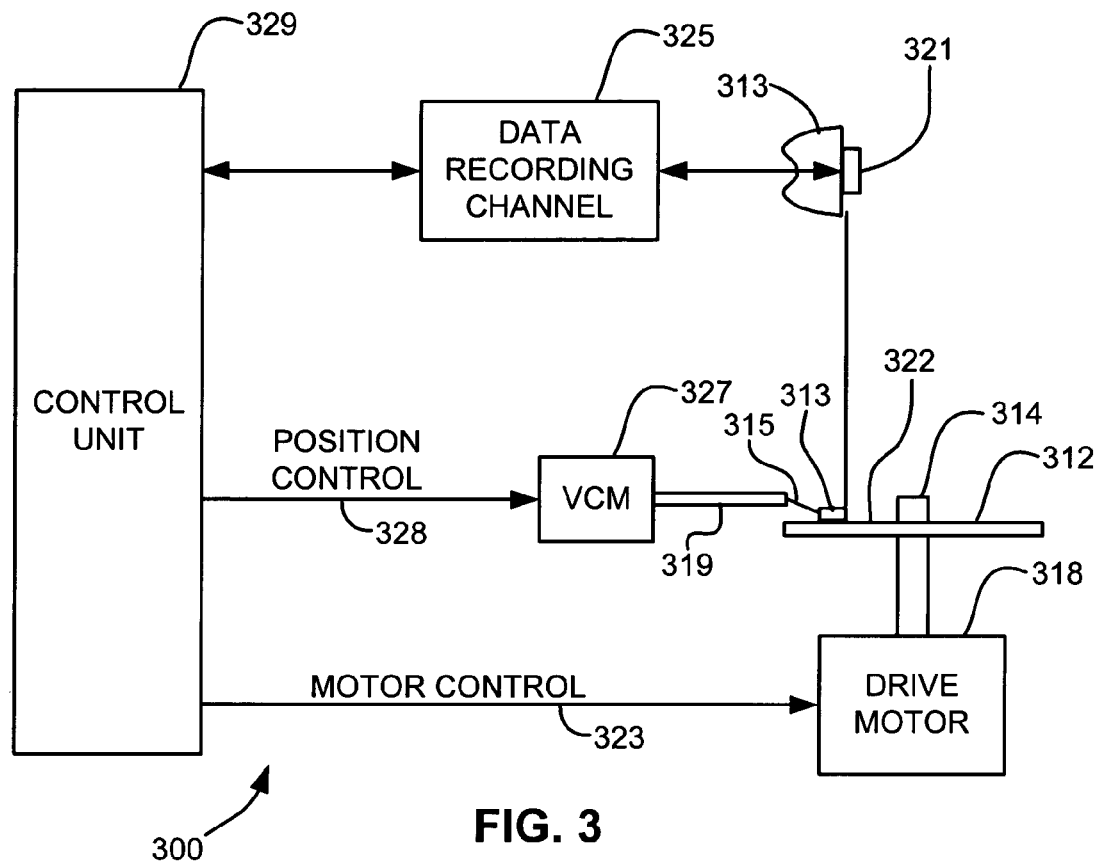
FIG. 3 is a perspective drawing of a magnetic disk drive system in accordance with one embodiment

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk.

At least one slider 313 is positioned on the disk, each slider supporting one or more magnetic read/write heads 321. As the disks rotate, slider is moved radially in and out over disk surface 322 so that heads may access different tracks of the disk where desired data are recorded. Each slider is attached to an actuator arm 319 by way of a suspension 315. The suspension provides a slight spring force which biases slider against the disk surface. Each actuator arm is attached to an actuator means 327. The actuator means as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk generates an air bearing between slider and disk surface which exerts an upward force or lift on the slider. The air bearing thus counter-balances the slight spring force of suspension and supports slider off and slightly above the disk surface by a small, substantially constant spacing during normal operation.

The various components of the disk storage system are controlled in operation by control signals generated by control unit, such as access control signals and internal clock signals. Typically, control unit comprises logic control circuits, storage means and a microprocessor. The control unit generates control signals to control various system operations such as drive motor control signals on line 323 and head position and seek control signals on line 328. The control signals on line 328 provide the desired current profiles to optimally move and position slider to the desired data track on disk. Read and write signals are communicated to and from read/write heads by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders. Further, it should be understood that the teachings found herein are equally applicable to the processing of any type of magnetic head, including tape heads.

Figure 4A:
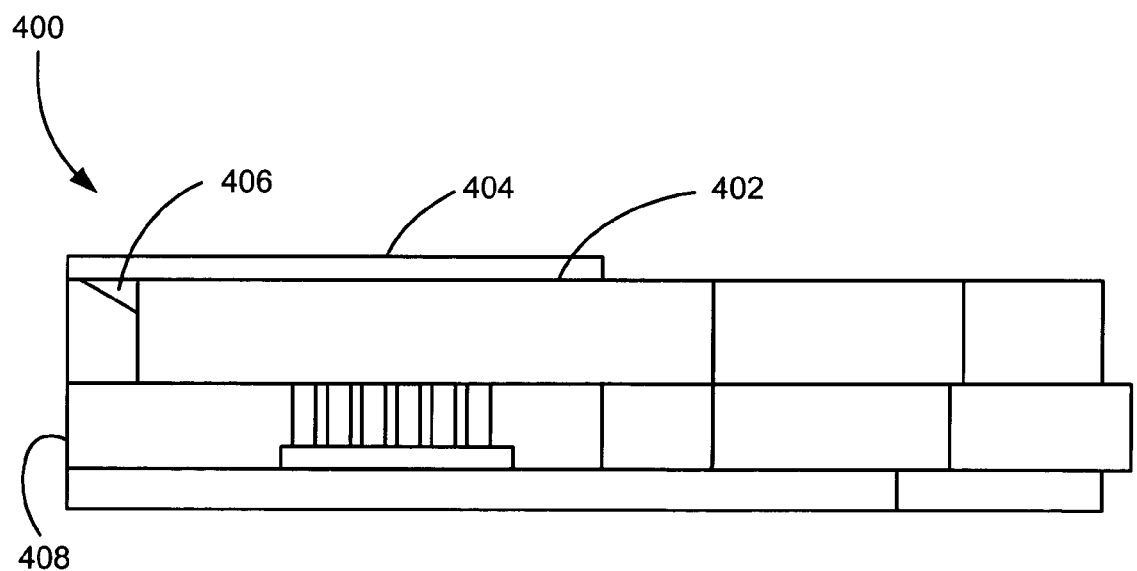
FIG. 4A is a partial cross sectional view of a perpendicular write head according to a preferred embodiment.
Figure 4B:
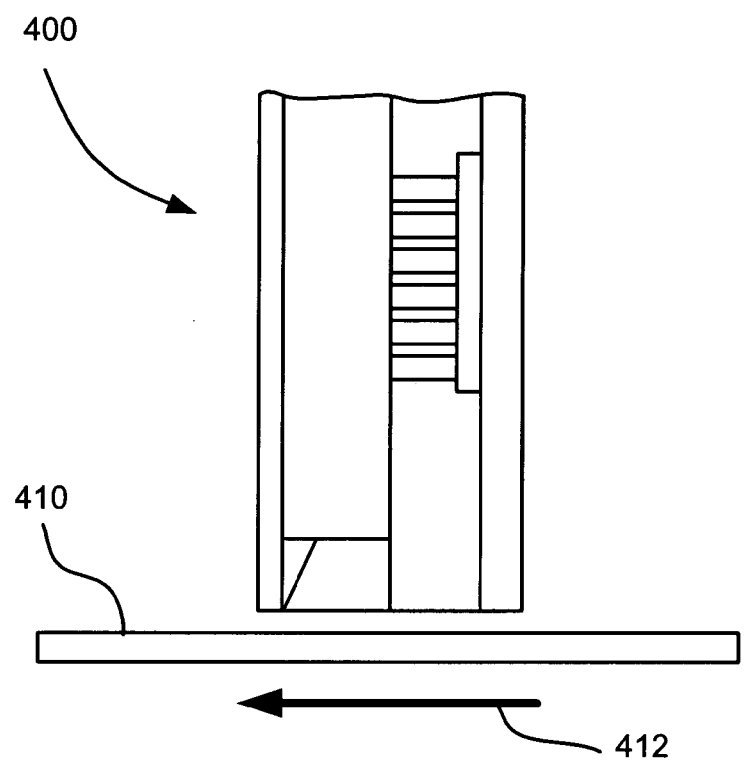
FIG. 4B is a partial cross sectional view of the perpendicular write head of FIG. 4A shown over a recording medium.

FIG. 4A is a partial cross sectional view of a perpendicular write head 400 according to a preferred embodiment. This is a single layer coil design, but the present invention is not to be limited to only one coil layer. As shown, the thick P2 flux shaping layer 402 and the thin P3 probe layer 404 are indicated. The taper section 406 is also shown. FIG. 4B illustrates the write head of FIG. 4A adjacent magnetic media 410, and indicating the direction of rotation of the media 412 relative to the head.

Referring again to FIG. 4A, a preferred angle of the taper of the taper section 406 is between about 10 and 80 degrees, more preferably between about 20 and 45 degrees, from an imaginary plane extending along the ABS 408.

One preferred geometry has the total thickness of pole 404 and taper section 406 about 2× the pole width. The pole 404 at the ABS would then be in the range of about ⅓ to ½ of the total thickness, or the tapered section 406 would be about 1× to 2× the pole thickness at the ABS.

With shallower taper angles, a thicker taper layer range is acceptable, but less write field will be obtained with very shallow taper angles. The upper limit to taper layer thickness is when it results in excessive side writing or is cutoff from the layers below by a bevel angle of 8–12 degrees on the pole which is designed to prevent writing on adjacent tracks under skew conditions.

Figure 5:
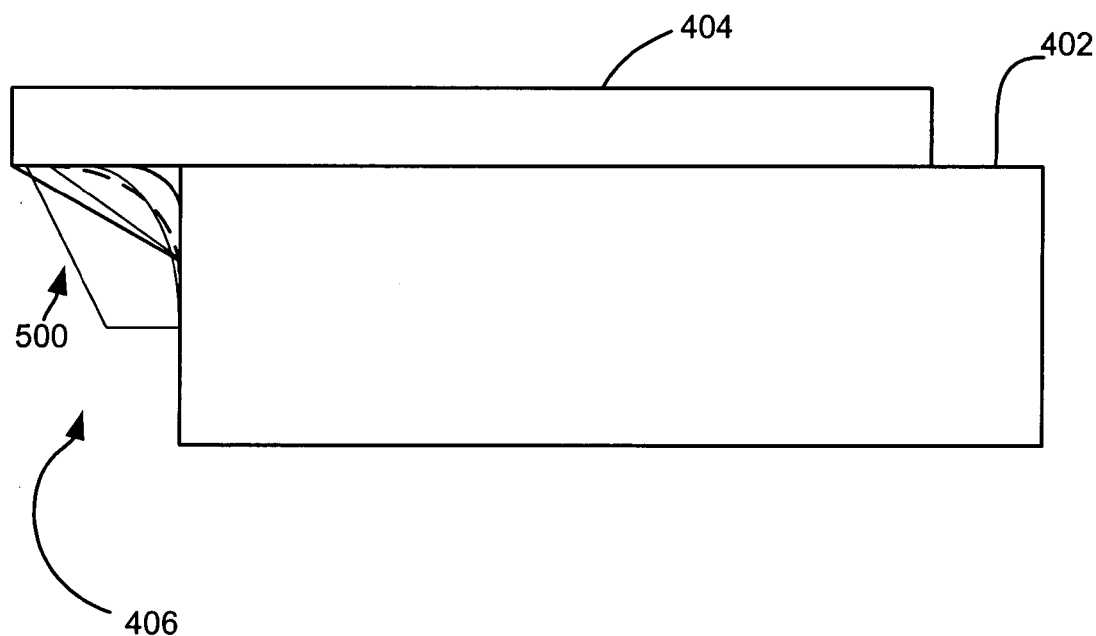
FIG. 5 is a partial cross sectional view of a write head indicating various shapes of a tapered portion of a head.

The taper section is not limited to this range and may take on various taper shapes as shown by the various profile lines 500 in FIG. 5. Again, these taper shapes are examples, and other taper shapes can be created. It is this taper portion that makes the cross-section of the P3 pole tip increase from the ABS to the P2 zero throat, and which improves the flux carrying capacity of the device.

Figure 6:
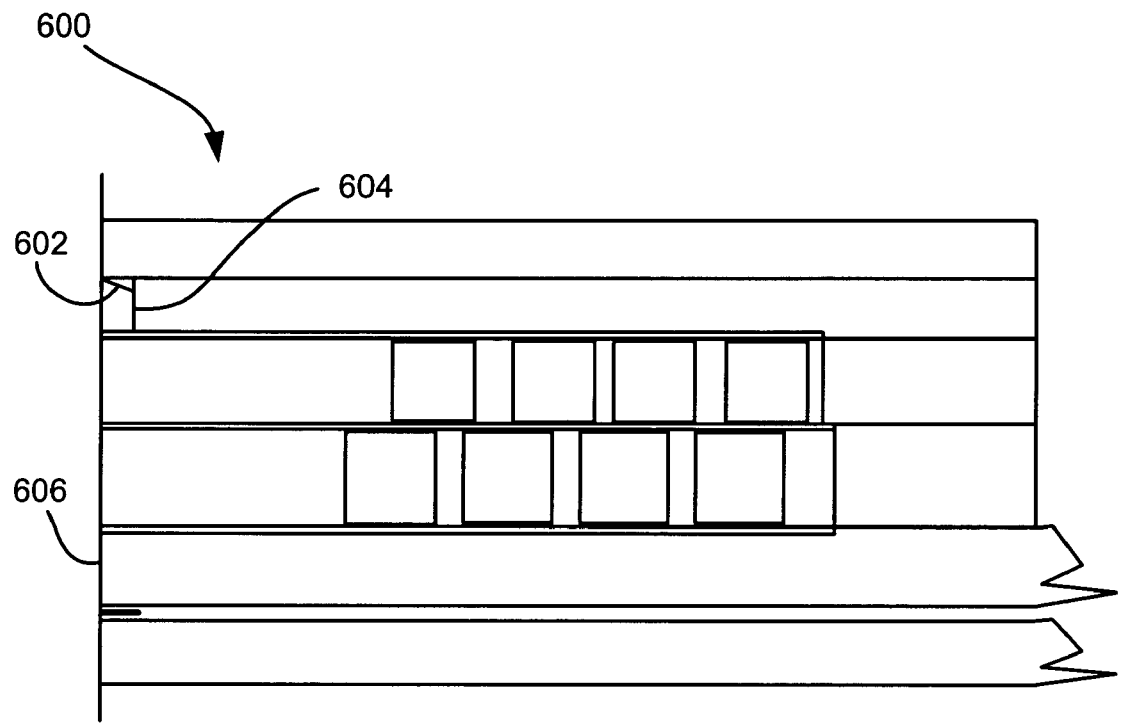
FIG. 6 is a partial cross sectional view of a bilayer platform sloping probe perpendicular inductive head according to one embodiment.

FIG. 6 illustrates a bilayer platform sloping probe perpendicular inductive head 600 according to one embodiment. As shown, the probe 602, extending from the ZTH 604, is slanted upwards towards the ABS 606. This fabrication technique permits less saturation after the ZTH with more flux reaching the disk.

Figure 7:
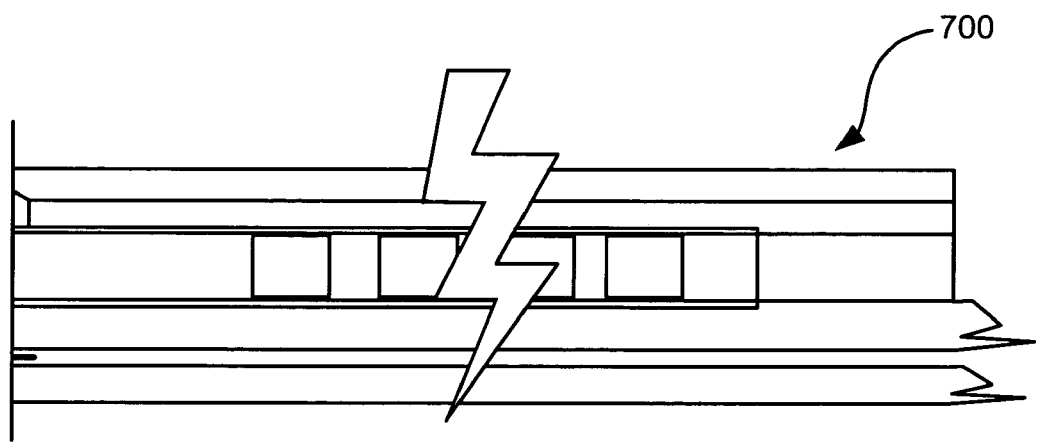
FIG. 7 is a partial cross sectional view of a single layer coil platform sloping probe perpendicular inductive head according to one embodiment.

FIG. 7 is illustrates a single layer coil platform sloping probe perpendicular inductive head 700 according to one embodiment.

Focused Ion Beam (FIB)

FIGS. 8A(i)–8N(ii) graphically illustrate a preferred method of fabrication of a perpendicular recording head according to one preferred embodiment. In particular, the layer by layer fabrication sequence defining a sloping surface, between the ZTH and the ABS, is shown were the recess in the alumina planarizing layer is made via focus ion beam machining (FIB). Note that an "(i)" in the Figure identifier indicates a partial cross-sectional view of the structure from the ABS, while a "(ii)" indicates the corresponding partial cross-sectional side view. Conventional processes understood by those skilled in the art are preferably used to perform most of the processing steps described below, and therefore general processing details will be given for much of the description. Note that these processing steps are provided by way of example, and any suitable manner of adding/processing layers can be used to form the structure.

FIGS. 8A(i) and 8A(ii) depict a read head 800 with a first pole (P1) 802. As shown in FIGS. 8B(i) and 8B(ii), the P1 is planarized, coils 804 are formed, insulation 806 is laid over the coils, and a back gap 808 is formed. Then thick alumina 810 is applied to the structure. Note that other suitable non-magnetic and insulating materials may be used in place of alumina.

Referring to FIGS. 8C(i) and 8C(ii), chemical mechanical polishing (CMP) is used to create a flat upper surface on the structure. Alumina is deposited and patterned, and an isolation layer 812 is formed. Then a shaping layer 814 is formed on the structure, as shown in FIGS. 8D(i) and 8D(ii). Alumina 816 is applied to the structure and then planarized using a CMP process. See FIGS. 8E(i) and 8E(ii).

As shown in FIGS. 8F(i) and 8F(ii), FIB trenching is performed on the alumina in front of the shaping layer to form a wedge-shaped recess 818. More particularly, a gradual indentation on the alumina layer is formed by adjusting the power and/or application time of the beam as the beam moves across the structure. For example, the beam can be moved towards and away from the ABS and the beam power increased as the beam moves away from the ABS and decreased as the beam travels towards the ABS. Alternatively, a beam of constant and/or varying power can be made to travel along the upper surface of the structure, with the speed of beam movement slowing as the beam travels away from ABS (or increasing as it moves towards the ABS) so that the beam creates a continually deeper indentation. Preferably, the focused ion beam is angled towards the ABS side of the nonmagnetic layer at an acute angle with respect to a plane of the surface 819 of the nonmagnetic layer being processed by the focused ion beam. One skilled in the art will understand that other alternatives for forming the trench by FIB trenching include moving the beam parallel to the ABS, moving the structure as opposed to the beam, angling the beam, etc. The resulting gradually deeper recess is preferably aligned both with respect to the ZTH and to the ABS.

Referring to FIGS. 8G(i) and 8G(ii), a high moment seed layer 820 is applied to the structure. As shown in FIGS. 8H(i) and 8H(ii), the a full film of high moment material 822 is added to the structure, such as by electroplating, to form a flux shaping layer (P2) of the desired thickness. P2 can be formed of NiFe or other suitable material.

Because the probe thickness and its profile are very important in defining the inductive head's resolution, the depth and placement of the recess should be formed as near to design specifications as possible. In the event that the recess depth is smaller than the desired final thickness of the probe, the top surface of the full film plated probe layer will self planarize. This takes place because during electroplating of the high moment material, both surfaces (see FIG. 8H(iii)) are being plated thus the recess depth is reduced two fold of the rate of thickness plated.

If the depth of the recess is too large then the solution is to plate thicker than the desired final probe thickness, and using a CMP technique, remove the extra plated material leaving a planar top surface for the probe layer. See FIGS. 8I(i) and 8I(ii).

The reentry profile of the side walls of the probe tip can be formed using a hard mask and ion milling. FIGS. 8J(i) and 8J(ii) illustrate the structure after addition of an alumina (C) hard mask 824. The extra depth of the probe does not need to have the same reentry profile throughout and only the ABS surface may have the probe shaped as such (e.g., 15 degrees per side of negative reentry profiles).

As shown in FIGS. 8K(i) and 8K(ii), a third probe (P3)/yoke 826 is formed. A photo mask 827 is applied to the structure. Referring to FIGS. 8L(i) and 8L(ii), the structure is milled such as via direct and/or angled ion milling to give the probe 826 a trapezoidal shape.

The resist 827 and fences are removed to provide the structure shown in FIGS. 8M(i) and 8M(ii). For example, if the hard mask is alumina (C), it can be removed using $O_2$ reactive ion etching (RIE).

Leads (not shown) are added and an alumina overcoat 828 is added to provide the head shown in FIGS. 8N(i) and 8N(ii).

The forgoing method provides a viable manufacturing process capable of being performed with tooling currently available. This process results in high throughput, good mechanical alignment, and low cost.

Ion Milling

Another process for forming a head (e.g., see FIG. 4) with a tapered probe and flux shaping layer is performed by ion milling. The general process for creating such a head follows. Note that many of the processing steps can be similar to or the same as the process described with reference to FIGS. 8A(i)–8N(ii).

Figure 9A:
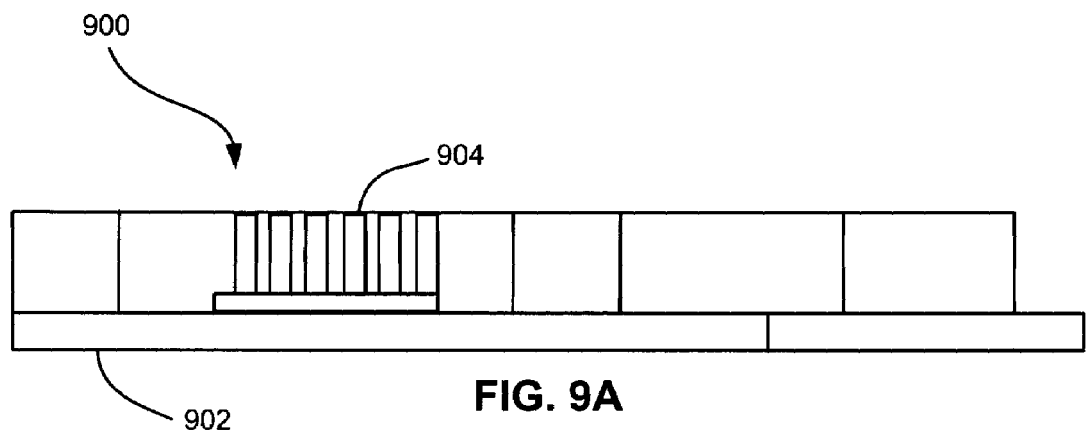
FIGS. 9A–9H graphically illustrate a method of fabrication of a perpendicular recording head using ion milling.
Figure 9B:
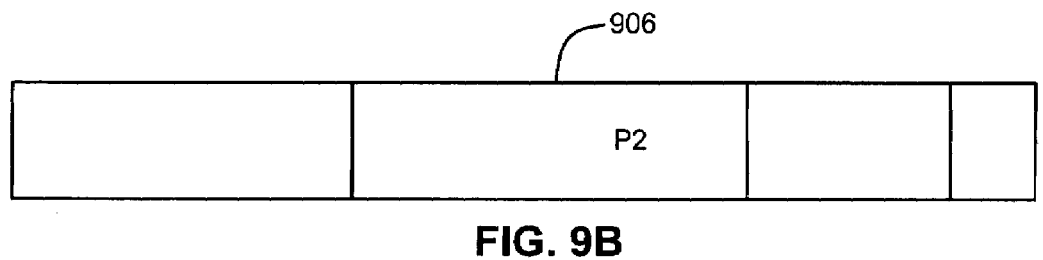

FIG. 9A illustrates a structure 900 after the read head (not shown), the P1 902, and the first layer of coils 904 are fabricated. The P2 flux shaping layer 906 shown in FIG. 9B is formed on the structure of FIG. 9A (not shown in FIG. 9B) and the surface is planarized via CMP.

Figure 9C:
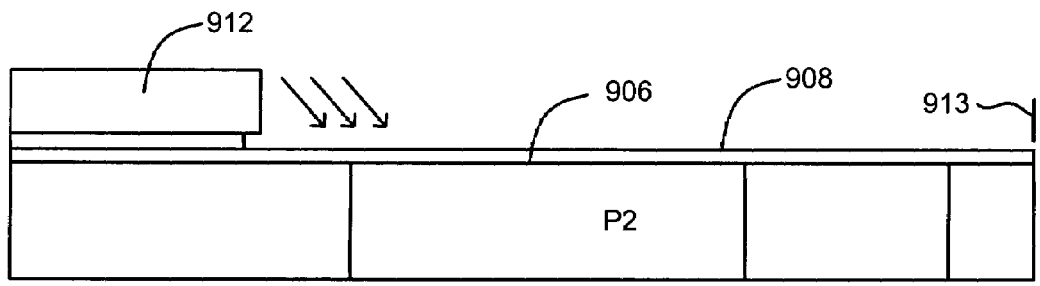

Referring to FIG. 9C, a sheet film of non-magnetic material 908, such as alumina, is deposited on the structure. Layer 908 may also be comprised of multiple layers, some of which could be used for end-point detection; for example, prior to the alumina deposition a thin layer of Rhodium could first be deposited as the end-point layer. As another optional step, CMP stop material (not shown, see FIG. 10B), such as carbon (C), can also be deposited on the structure. Photoresist, optionally bilayer photoresist 912, of a predetermined thickness is added to the structure. This provides shadowing of the ion beam during ion milling to create a tapered shape in the nonmagnetic material. One suitable bilayer photoresist combination is a PMGI release layer with a thicker layer of standard photoresist deposited thereon. This combination makes the photoresist easier to remove.

Figure 9D:
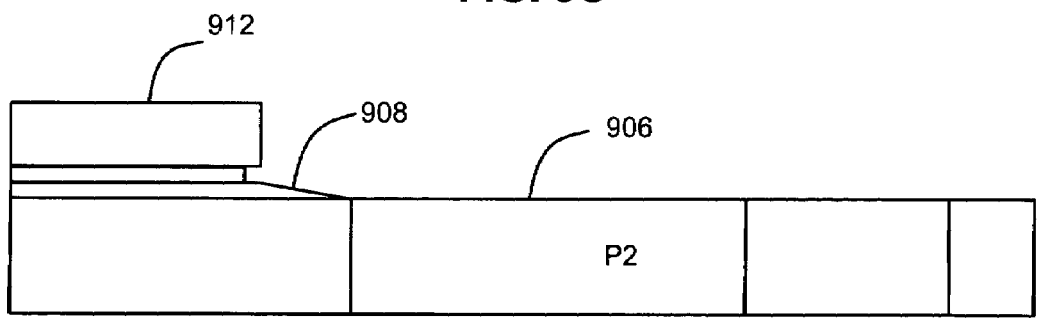

One may also choose to use RIE to remove the alumina (C), if deposited. The structure is ion milled at a predetermined angle, such as between about 10 to 80 degrees, preferably between about 10 to 45 degrees, from a plane 913 extending perpendicular to the nonmagnetic layer to remove the non-magnetic material. Preferably, the structure and/or ion beam is pivoted such that the angle that the ions strike the non-magnetic material varies, such as between about 10 to 80 degrees, preferably between about 10 to 45 degrees, in order to control the angle of the milling. Due to the shadowing from the photoresist, there will be a tail or taper produced in the non-magnetic material, as shown in FIG. 9D. The dimensions of the taper are controlled by the ion milling, shadowing geometry, and film material and thicknesses. Multiple ion milling steps may be employed.

Figure 9E:
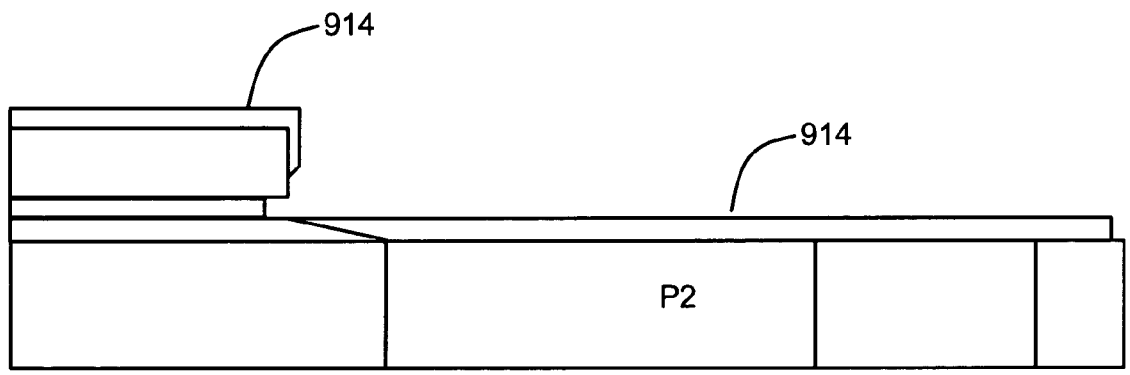

As shown in FIG. 9E, a layer of magnetic material 914 is added to the structure to fill in the gap created by the ion milling. This layer will form part of P3. A preferred method of adding the magnetic material is via magnetron sputtering.

Figure 9F:
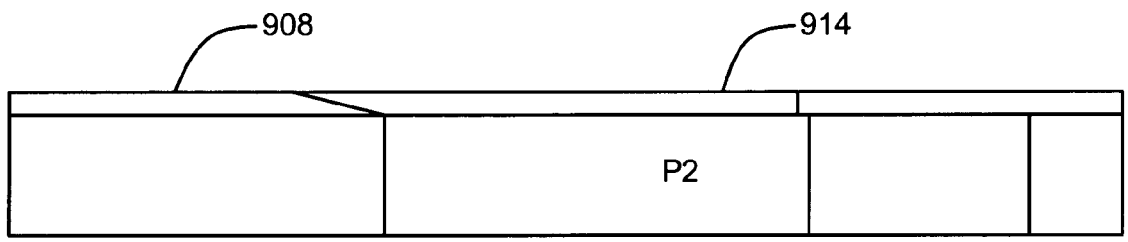
Figure 9G:
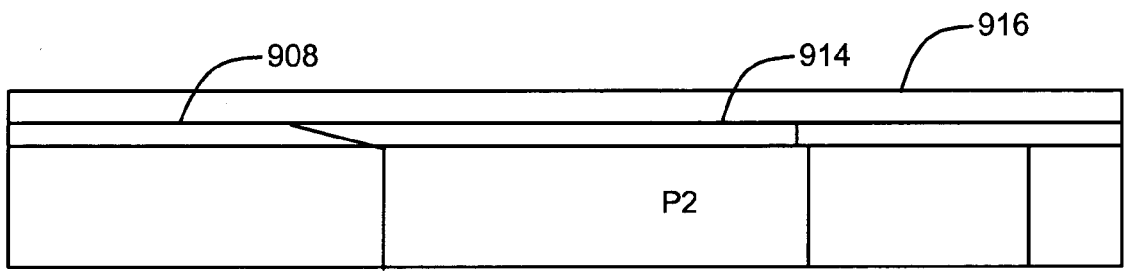
Figure 9H:
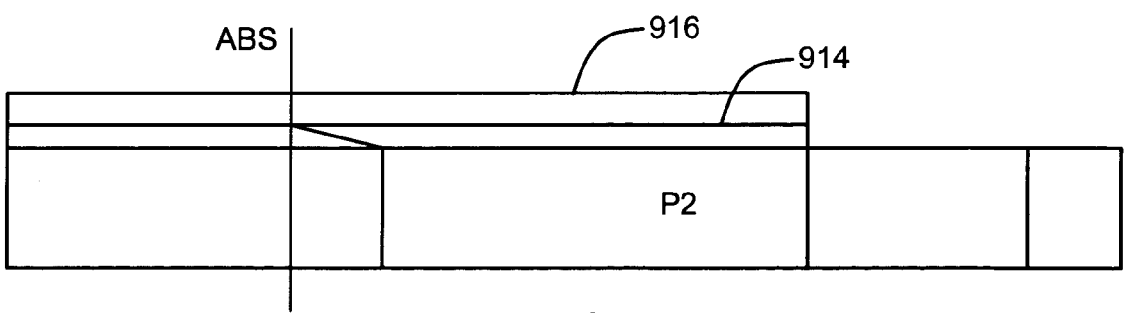

The resist is removed, such as via a liftoff process, leaving the structure depicted in FIG. 9F. The final structure is essentially planar. Note that no CMP is necessary. A layer of magnetic P3 material 916 is deposited on the structure to form the structure shown in FIG. 9G. Optionally, CMP processing can be used to reduce the structure down to the alumina (C) hard-stop layer (if present). The P3 probe is formed using the ion milling/hardmask as previously described. See FIG. 9H. Then the structure is then lapped back towards the taper to form the ABS at the desired position. Note that better performance is achieved the closer the ABS is to the tip of the tapered portion.

FIGS. 10A–10F illustrate another process for forming a head with a tapered probe and flux shaping layer using ion milling. The general process for creating such a head follows. Note that many of the processing steps can be similar to or the same as the process described with reference to FIGS. 8A(i)–8N(ii) and 9A–9E.

Figure 10A:
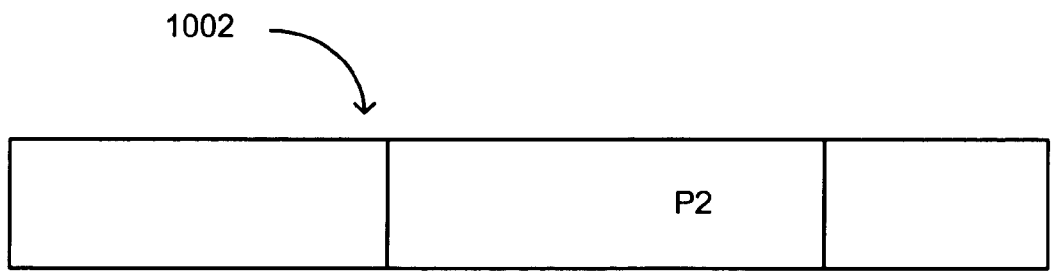
FIGS. 10A–10F graphically illustrate another method of fabrication of a perpendicular recording head using ion milling.
Figure 10B:
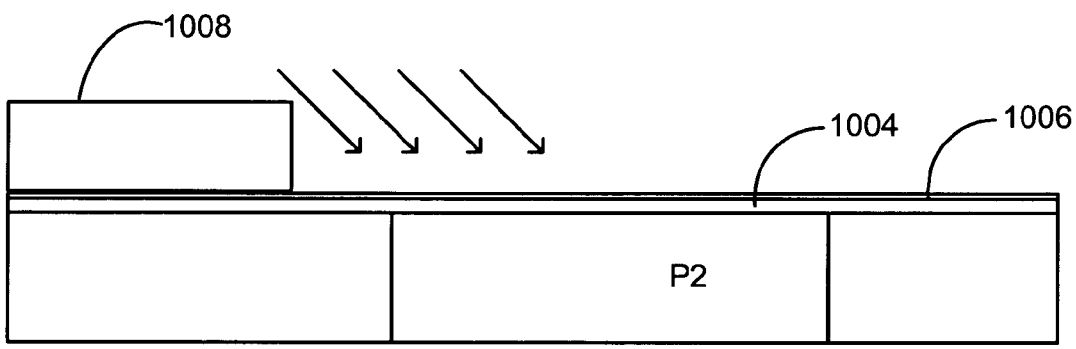

The P2 flux shaping layer 1002 shown in FIG. 10B is formed on a structure such as the structure shown in FIG. 9A, and the surface is planarized via CMP.

Figure 10C:
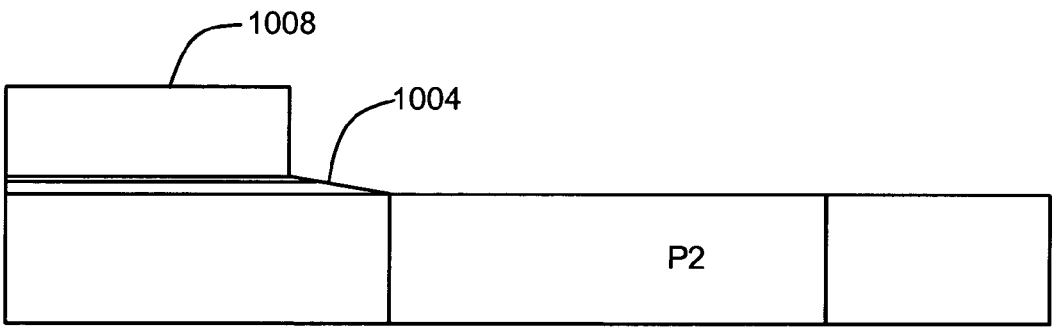

Referring to FIG. 10B, a sheet film of non-magnetic material 1004, such as alumina, is deposited on the structure. As an optional step, CMP stop material 1006, such as alumina (C), can be deposited on the structure. Photoresist 1008, optionally bilayer photoresist, of a given thickness is added to the structure. This provides shadowing of the ion beam during ion milling to create a tapered shape in the nonmagnetic material. One may also choose to use RIE to remove the alumina (C), if deposited. The structure is ion milled at a predetermined angle, such as about 10 to 80 degrees, preferably about 10 to 45 degrees, to remove the non-magnetic material. Preferably, the structure and/or ion beam is pivoted such that the angle that the ions strike the non-magnetic material varies in order to control the angle of the milling. Due to the shadowing from the photoresist, there will be a tail or taper produced in the non-magnetic material, as shown in FIG. 10C. The dimensions of the taper are controlled by the ion milling, shadowing geometry, and film material and thicknesses.

Figure 10D:
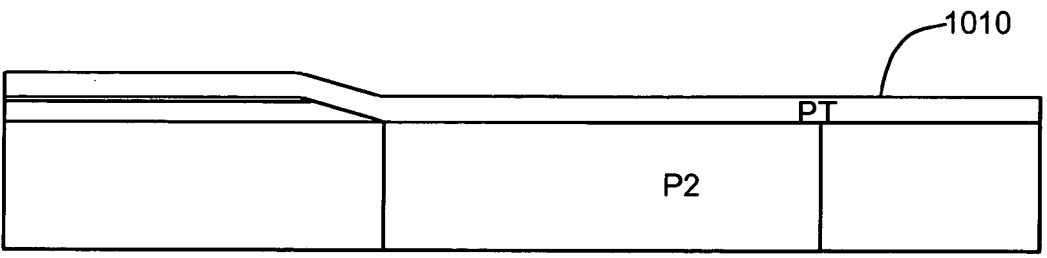
Figure 10E:
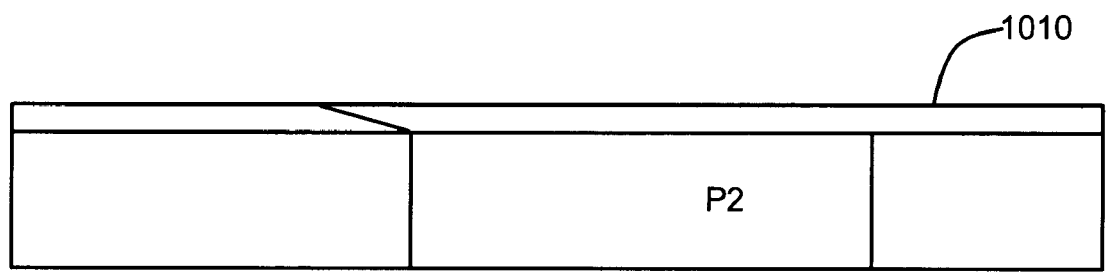

The resist is then removed. As shown in FIG. 10D, a layer of magnetic material 1010 is added to the structure to fill in the gap created by the ion milling. This layer will form part of P3. A preferred method of adding the magnetic material is via magnetron sputtering. CMP processing is performed to the reduce the structure down to the non-magnetic material, as shown in FIG. 10E.

Figure 10F:
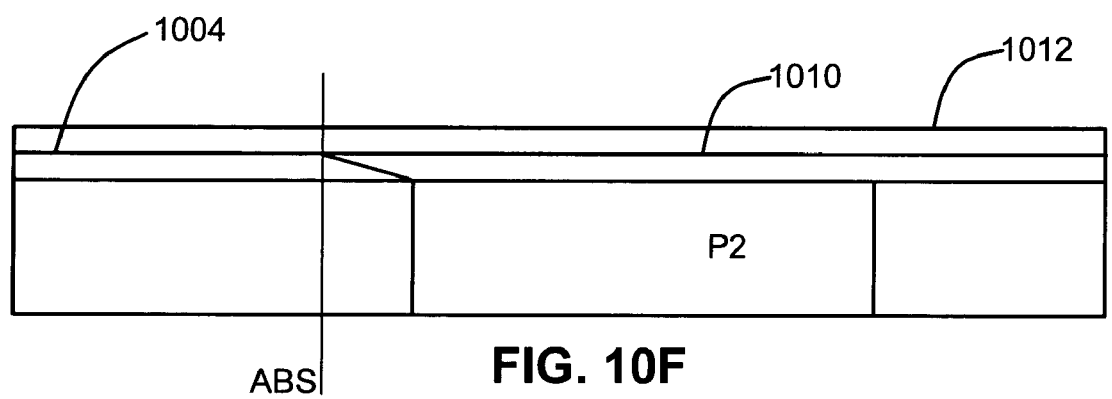

A layer of magnetic P3 material 1012 is deposited on the structure to form the structure shown in FIG. 10F. Optionally, CMP processing can be used to reduce the structure down to the alumina (C) hard-stop layer (if present). The P3 probe is formed using the ion milling/hardmask as previously described. See FIG. 10H.

Note that though ion milling has been described as a preferred method, any suitable milling process may be used using these generally concepts, as will be understood by one skilled in the art.

The FIB and ion milling techniques offer several advantages including the following. Conventional FIB, ion milling and photolithography technology can be used; the techniques are cost-effective, with the ion milling technique being more cost-effective due to its higher throughput; the taper is fabricated at the wafer level, not the slider level; the taper is fabricated in a separate step from the P3 probe, with no need to modify the P3 probe; the technique does not damage the P3 probe magnetic material; the technique offers the possibility of using different materials for the taper and for the P3 probe; and, the technique results in devices that are more robust in disk drive environments.

Chemical Mechanical Polishing (CMP)

Figure 11A:
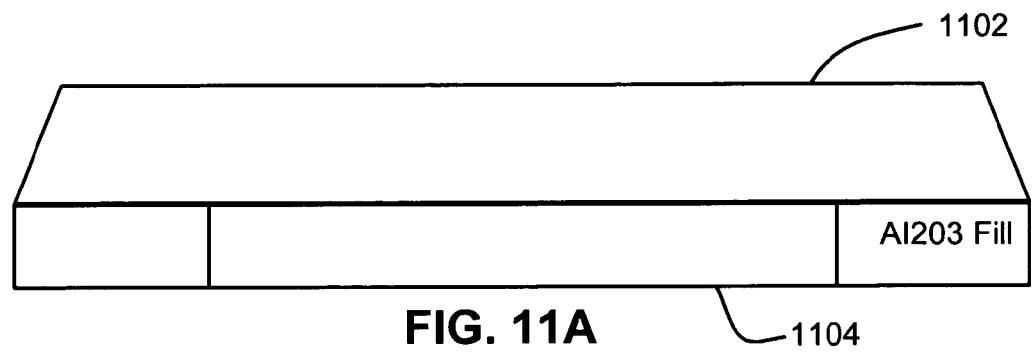
FIGS. 11A–11D graphically illustrate a method of fabrication of a perpendicular recording head using chemical mechanical polishing.
Figure 11B:
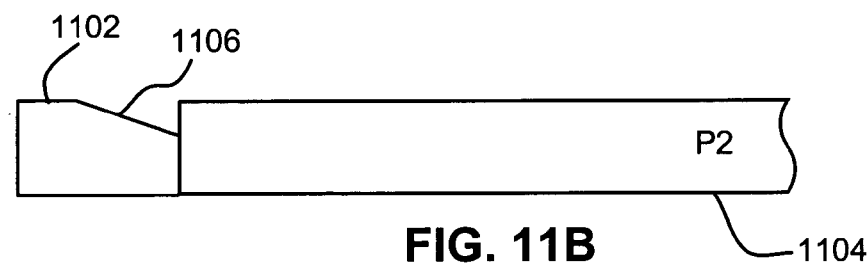

Yet another technique for forming a perpendicular recording head is shown in FIGS. 11A–D. According to the process, a flux shaping layer (P2) is formed, preferably by plating. As shown in FIG. 11A, nonmagnetic material 1102, such as dielectric alumina, is deposited around the P2 1104, preferably by sputtering, but other techniques may be used. The structure of FIG. 11A is planarized to form the structure shown in FIG. 11B. The alumina is processed via CMP to form a wedge shaped recess 1106, as depicted in FIG. 11B. Note that the wedge shaped recess 1106 is only shown in the relevant region, even though it exists all around the P2 structure.

The characteristics of the void are dependent upon the stoichiometry of the alumina laid down and the CMP process. During deposition, the alumina grows up from the bottom and out from the side of NiFe pole. How the alumina is deposited (sputtered) is important, because as the process parameters are varied, so too are the properties of the nonmagnetic material. In other words, the stoichiometry, structure, and properties of the alumina can be controlled (voids, structure, amount of interstitial AR, and, significantly, subsequent etch rates). Because the properties of the alumina can be estimated, how CMP processing will react with the alumina at and around the alumina/P2 interface can also be estimated. Thus, the process parameters are adjusted during alumina deposition to control how later CMP processing will etch the alumina to form the taper shape. In particular, the processes are controlled to provide known specifics of the growth of the alumina from the bottom and at alumina/P2 interface. CMP processing is performed using parameters that create trenching at the alumina/P2 interface. Note that a multi-step CMP process may be performed, with alumina redeposited under prespecified conditions. For example, a second alumina deposition using PVD or IBD can be performed to achieve the desired growth characteristics, followed by a second CMP step.

Figure 11C:
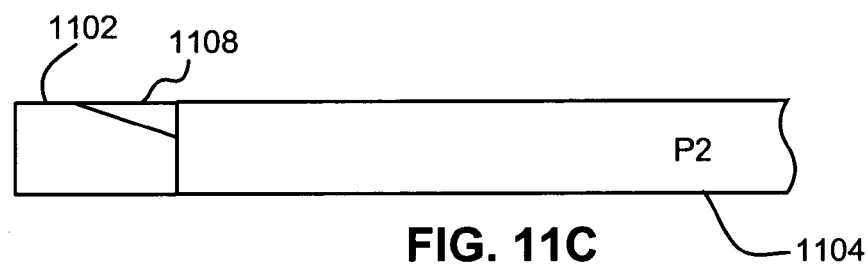

Referring to FIG. 11C, the recess is filled with magnetic material using any desired process. Optionally, additional CMP may be performed to planarize the recess fill. Also, CMP stop material may be used, such as alumina (C) and/or Ta.

Figure 11D:
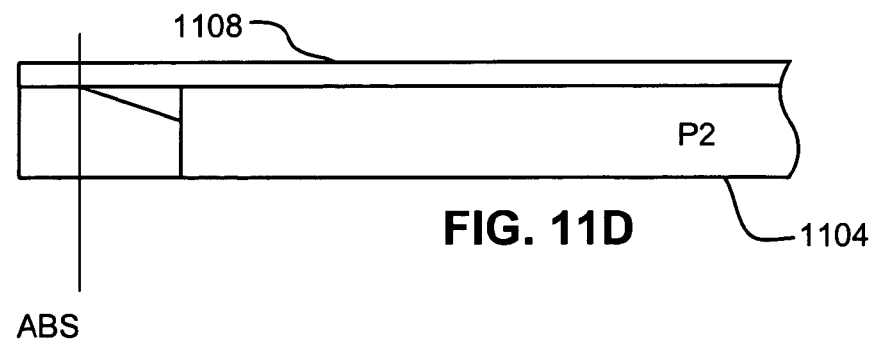

As shown in FIG. 11D, magnetic material is added to the top of the structure to form the P3 probe 1108. Then the P3 shape is defined as previously described.

The concepts discussed herein should be understood by one skilled in the art, and therefore no particular numerical parameters are set forth, as such parameters would be process specific (i.e., specific to particular tools, process conditions, and materials used.

Nano Indentation/Nano Scratching

Figure 12A:
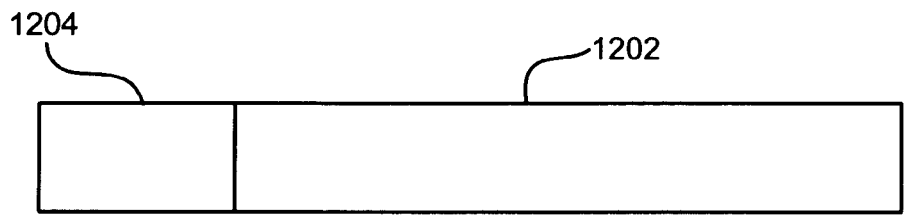
FIGS. 12A–12E graphically illustrate another method of fabrication of a perpendicular recording head using nano indentation or nano scratching.
Figure 12B:
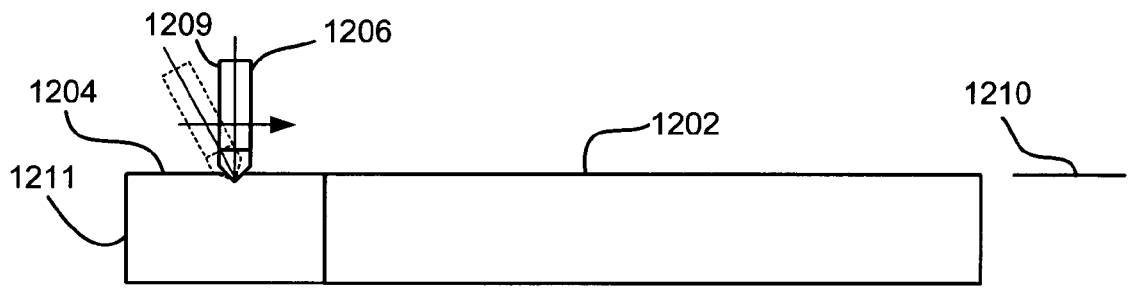
Figure 12C:
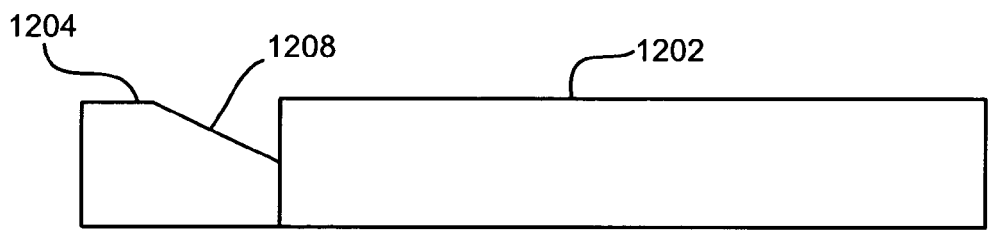
Figure 12D:
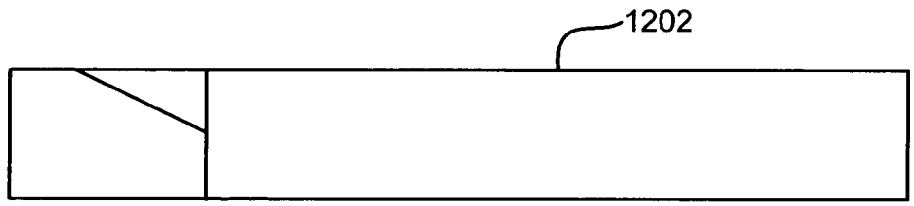
Figure 12E:
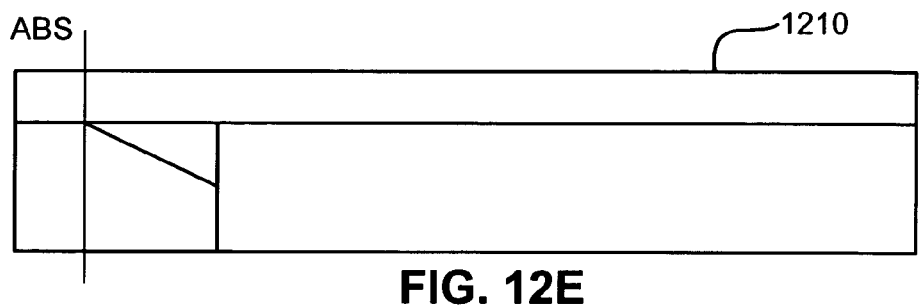

Yet another method of forming a head with a taper portion is built starting with a planar surface consisting of a P2 shaping layer 1202 and nonmagnetic material (e.g., alumina) 1204, as shown in FIG. 12A. Referring to FIGS. 12B and 12C, an indentation (recess) 1208 is added to the structure by using a nano-indenter device 1206 to produce the desired taper dimensions in the field material. The device can have a diamond tip of a known shape (conical, cube-corner, pyramid-shaped, etc.). Depending on the shape of the tip, how the tip is angled will determine the shape of the indentation. The tip of the device is shown in shadow at another illustrative angle. The preferred angle of the tip is in an arc between a plane 1209 perpendicular to the plane 1210 of the nonmagnetic layer, and an acute angle towards the ABS end of the 1211 of the nonmagnetic layer. In order to achieve the final shape, it may be preferable to aim the tip at an angle a little less acute than the desired indentation due to material relaxation. Then magnetic material 1210 is deposited, filling the trench and covering the entire wafer to form the P3 probe. Note that the trench can be filled during a separate process step prior to formation of the P3 layer, as shown in FIGS. 12D and 12E. Also, the trench fill material may be different than the material forming the P3 layer.

A variation of the technique would be to scratch the nonmagnetic material using a nano-scratch device. According to this process, the force applied by the device is ramped up (or reduced) as the tip moves across the wafer.

These tools can be automated to fabricate an entire wafer. Also, several devices can be used to create several indentations in parallel.

General

Note that many of the processing steps described above can be "mixed and matched" in any of the other processes, as will be understood by one skilled in the art.

There have thus been described several new and novel processes for forming a probe tip with tapered section. Using the methodologies described herein, tapered portions can be added to the leading edge, trailing edge, or both. Note that it is preferred to position the tapered portion on the leading edge (i.e., the edge that disk hits first), as this does not disturb the portion of the media being written to, and allows greater area at the bottleneck while limiting the area at the ABS. The result of tapering the leading edge is more write field.

The angle of the taper can be 10–75 degrees, preferably 20–45 degrees, as measured from a plane perpendicular to the ABS.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess.

2. The method as recited in claim 1, wherein the recess is formed by focused ion beam processing.

3. The method as recited in claim 1, wherein the recess is formed by chemical mechanical polishing.

4. The method as recited in claim 1, further comprising processing the fist pole, nonmagnetic layer, and probe for forming an ABS.

5. A method for fabricating a magnetic head comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is formed by focused ion beam processing, and the focused ion beam is angled towards an ABS side of the nonmagnetic layer at an acute angle with respect to a plane of the surface of the nonmagnetic layer being processed by the focused ion beam.

6. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is formed by focused ion beam processing, and a power of the focused ion beam increases as the focused ion beam travels towards the flux shaping layer.

7. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is formed by focused ion beam processing, and a power of the focused ion beam decreases as the focused ion beam travels away from the flux shaping layer.

8. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the probe layer is subsequently reduced by chemical mechanical polishing for reducing a thickness thereof.

9. A method for fabricating a magnetic head, comprising;
forming a first pole;
forming a flux shaping layer in spaced relation to the first pole;

forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein an angle of the taper of the taper recess is between about 10 and 75 degrees with respect to an imaginary plane extending through the nonmagnetic layer and the flux shaping layer.

10. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein an angle of the taper of the taper recess is between about 20 and 45 degrees with respect to an imaginary plane extending through the nonmagnetic layer and the flux shaping layer.

11. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is formed by chemical mechanical polishing, and the step of forming the nonmagnetic layer adjacent the flux shaping layer includes forming the nonmagnetic layer under processing conditions which provide predictable properties of the nonmagnetic layer near an edge of the nonmagnetic layer positioned towards the flux shaping layer.

12. The method as recited in claim 11, further comprising repeating the steps of forming the nonmagnetic layer and chemical mechanical polishing at least one additional time for forming the tapered recess.

13. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is formed by chemical mechanical polishing, and an angle of the taper of the taper recess is between about 10 and 75 degrees with respect to an imaginary plane extending through the nonmagnetic layer and the flux shaping layer.

14. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is formed by chemical mechanical polishing, and an angle of the taper of the taper recess is between about 20 and 45 degrees with respect to an imaginary plane extending through the nonmagnetic layer and the flux shaping layer.

15. A method for fabricating a magnetic head comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is formed by nano-indentation using a nano-indentation device.

16. The method as recited in claim 15, wherein a tip of the device engaging the nomnagnetic layer is positioned within an acute arc extending towards an ABS end of the nonmagnetic layer and a perpendicular line extending outwardly from an imaginary plane extending through the nonmagnetic layer and the flux shaping layer.

17. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is formed by nano-scratching using a nono-scratch device.

18. The method as recited in claim 17, wherein a tip of the device engaging the nonmagnetic layer is positioned within an acute arc extending towards an ABS end of the nonmagnetic layer and a perpendicular line extending outwardly from an imaginary plane extending through the nonmagnetic layer and the flux shaping layer.

19. A method for fabricating a magnetic head, comprising:
forming a first pole;
forming a flux shaping layer in spaced relation to the first pole;
forming a nonmagnetic layer adjacent the flux shaping layer and positioned on an air bearing surface (ABS) side of the flux shaping layer;
creating a tapered recess in the nonmagnetic layer, the taper of the recess increasing towards the flux shaping layer;
filling the recess with a magnetic material; and
forming a probe layer, the probe layer being in magnetic communication with the magnetic material filling the recess;
wherein the recess is filled and the probe layer is formed during the same processing step.

* * * * *

UNITED STATES PATENT AND TRADEMARK OFFICE
CERTIFICATE OF CORRECTION

| | | |
|---|---|---|
| PATENT NO. | : 7,185,415 B2 | Page 1 of 1 |
| APPLICATION NO. | : 10/653046 | |
| DATED | : March 6, 2007 | |
| INVENTOR(S) | : Khera et al. | |

It is certified that error appears in the above-identified patent and that said Letters Patent is hereby corrected as shown below:

col. 11, line 57 change "magnetic head comprising" to --magnetic head, comprising--;
col. 14, line 47 change "nomnagnetic" to --nonmagnetic--.

Signed and Sealed this

Twenty-fourth Day of April, 2007

JON W. DUDAS
*Director of the United States Patent and Trademark Office*